(12) United States Patent
Lee et al.

(10) Patent No.: US 9,258,772 B2
(45) Date of Patent: Feb. 9, 2016

(54) APPARATUS FOR PERFORMING A CELL SELECTION IN A WIRELESS COMMUNICATION SYSTEM AND METHOD THEREOF

(75) Inventors: Kyungjun Lee, Anyang-si (KR);
Sungjun Park, Anyang-si (KR);
Sunghoon Jung, Anyang-si (KR);
Youngdae Lee, Anyang-si (KR);
Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 13/985,695

(22) PCT Filed: Feb. 10, 2012

(86) PCT No.: PCT/KR2012/000995
§ 371 (c)(1),
(2), (4) Date: Aug. 15, 2013

(87) PCT Pub. No.: WO2012/115377
PCT Pub. Date: Aug. 30, 2012

(65) Prior Publication Data
US 2013/0322320 A1 Dec. 5, 2013

Related U.S. Application Data

(60) Provisional application No. 61/445,020, filed on Feb. 21, 2011.

(51) Int. Cl.
*H04L 12/801* (2013.01)
*H04L 12/26* (2006.01)
*H04W 80/04* (2009.01)
*H04W 88/06* (2009.01)
*H04W 28/04* (2009.01)
*H04W 72/04* (2009.01)
*H04W 48/20* (2009.01)
*H04W 48/12* (2009.01)

(52) U.S. Cl.
CPC .............. *H04W 48/20* (2013.01); *H04W 48/12* (2013.01)

(58) Field of Classification Search
CPC ....... H04L 47/10; H04L 43/50; H04W 80/04; H04W 88/06; H04W 28/04; H04W 72/04
USPC .......................................... 370/252, 328, 329
See application file for complete search history.

(56) References Cited

U.S. PATENT DOCUMENTS

2009/0238117 A1* 9/2009 Somasundaram et al. .... 370/328
2010/0197310 A1 8/2010 Jung et al.
2011/0034169 A1 2/2011 Roberts et al.

FOREIGN PATENT DOCUMENTS

EP 2 262 309 A1 12/2010

* cited by examiner

*Primary Examiner* — Ronald B Abelson
(74) *Attorney, Agent, or Firm* — Birch, Stewart, Kolasch & Birch, LLP

(57) ABSTRACT

The present invention relates to a method of performing a cell selection by a User Equipment (UE) in a wireless communication system. The present invention includes receiving a plurality of priority information, wherein each of the plurality of priority information includes an identifier, determining priority information having an identifier matched with an identifier stored in the UE, and performing the cell selection based on the determined priority information.

8 Claims, 7 Drawing Sheets

Fig. 5

```
-- ASN1START
SystemInformationBlockType5 ::=    SEQUENCE {
    interFreqCarrierFreqList           InterFreqCarrierFreqList,
    ...,
    lateNonCriticalExtension           OCTET STRING            OPTIONAL    -- Need OP
}

InterFreqCarrierFreqList ::=        SEQUENCE (SIZE (1..maxFreq)) OF InterFreqCarrierFreqInfo InterFreqCarrierFreqInfo ::=        SEQUENCE {
    dl-CarrierFreq                     ARFCN-ValueEUTRA,
    q-RxLevMin                         Q-RxLevMin,
    p-Max                              p-Max                   OPTIONAL,   -- Need OP
    t-ReselectionEUTRA                 T-Reselection,
    t-ReselectionEUTRA-SF              SpeedStateScaleFactors  OPTIONAL,   -- Need OP
    threshX-High                       ReselectionThreshold,
    threshX-Low                        ReselectionThreshold,
    allowedMeasBandwidth               AllowedMeasBandwidth,
    presenceAntennaPort1               PresenceAntennaPort1,
    cellReselectionPriority            CellReselectionPriority OPTIONAL,   -- Need OP
    groupSpecificInfoList              GroupSpecificInfoList   OPTIONAL,   -- Need OP
    neighCellConfig                    NeighCellConfig,
    q-OffsetFreq                       Q-OffsetRange           DEFAULT dB0,
    interFreqNeighCellList             InterFreqNeighCellList  OPTIONAL,   -- Need OR
    interFreqBlackCellList             InterFreqBlackCellList  OPTIONAL,   -- Need OR
    ...,
    [[ q-QualMin-r9                    Q-QualMin-r9            OPTIONAL,   -- Need OP
       threshX-Q-r9                    SEQUENCE {
           threshX-HighQ-r9                ReselectionThresholdQ-r9,
           threshX-LowQ-r9                 ReselectionThresholdQ-r9
       }                                                       OPTIONAL    -- Cond RSRQ
    ]]
}
GroupSpecificInfoList ::=           SEQUENCE (SIZE (1..maxGroupInfo)) OF GroupSpecificInfo GroupSpecificInfo ::=               SEQUENCE {
    groupID                            BIT STRING (SIZE (16)),
    cellReselectionPriority            CellReselectionPriority,
    areaConfiguration-r10              AreaConfiguration-r10   OPTIONAL,   -- Need OR
    ProbabilityFactor                  ENUMERATED {
                                           p00, p05, p10, p15, p20, p25,
                                           p30, p40, p50, p60, p70, p75,
                                           p80, p85, p90, p95}  OPTIONAL,  -- Need OP
}
InterFreqNeighCellList ::=          SEQUENCE (SIZE (1..maxCellInter)) OF InterFreqNeighCellInfo
InterFreqNeighCellInfo ::=          SEQUENCE {
    physCellId                         PhysCellId,
    q-OffsetCell                       Q-OffsetRange }
}
InterFreqBlackCellList ::=          SEQUENCE (SIZE (1..maxCellBlack)) OF PhysCellIdRange
-- ASN1STOP
```

APPARATUS FOR PERFORMING A CELL SELECTION IN A WIRELESS COMMUNICATION SYSTEM AND METHOD THEREOF

This application is the National Phase of PCT/KR2012/000995 filed on Feb. 10, 2012, which claims priority under 35 U.S.C. 119(e) to U.S. Provisional Application No. 61/445,020 filed on Feb. 21, 2011, all which are hereby expressly incorporated by reference into the present application.

TECHNICAL FIELD

The present invention relates to a wireless mobile communication system, and more particularly, to an apparatus for performing a cell selection and method thereof.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmission power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi-carrier frequency division multiple access) system and the like.

DISCLOSURE OF INVENTION

Technical Problem

Accordingly, the present invention is directed to a wireless communication system that substantially obviates one or more of the problems due to limitations and disadvantages of the related art.

An object of the present invention is to provide an apparatus for transmitting and receiving system information for an efficient cell selection in a wireless communication system and method thereof.

Technical tasks obtainable from the present invention may be non-limited by the above mentioned technical tasks. And, other unmentioned technical tasks can be clearly understood from the following description by those having ordinary skill in the technical field to which the present invention pertains.

Solution to Problem

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of performing a cell selection by a User Equipment (UE) in a wireless communication system according to the present invention includes receiving a plurality of priority information, each of the plurality of priority information including an identifier, determining priority information having an identifier matched with an identifier stored in the UE, and performing the cell selection based on the determined priority information.

Preferably, the plurality of priority information is included in broadcasted system information.

More preferably, the broadcasted system information includes common priority information.

In this case, the method further includes performing the cell selection based on the common priority information if there is no priority information having the identifier matched with the identifier stored in the UE.

And, the method further includes generating a random number if the determined priority information includes a probability factor and determining whether the generated random number is larger than the probability factor.

In particular, the method further includes performing the cell selection based on the common priority information if the generated random number is smaller than the probability factor.

More preferably, the method further includes performing the cell selection based on the common priority information, if there is no the identifier stored in the UE.

To further achieve these and other advantages and in accordance with the purpose of the present invention, an apparatus for performing a cell selection in a wireless communication system according to the present invention includes a receiver configured to receive data or information and a processor configured to control the receiver to receive a plurality of priority information, wherein each of the plurality of priority information includes an identifier, configured to determine priority information having an identifier matched with an stored identifier, and configured to perform the cell selection based on the determined priority information.

Preferably, the plurality of priority information is included in broadcasted system information.

More preferably, the broadcasted system information includes common priority information.

In this case, the processor is configured to perform the cell selection based on the common priority information if there is no priority information having the identifier matched with the stored identifier.

And, the processor is configured to generate a random number if the determined priority information includes a probability factor, and configured to determine whether the generated random number is larger than the probability factor.

In particular, the processor is configured to perform the cell selection based on the common priority information if the generated random number is smaller than the probability factor.

More preferably, the processor is configured to perform the cell selection based on the common priority information, if there is no the stored identifier.

It is to be understood that both the foregoing general description and the following detailed description are exemplary and explanatory and are intended to provide further explanation of the invention as claimed.

Advantageous Effects of Invention

According to the present invention, a method and apparatus for transmitting and receiving system information including a plurality of priority information in a wireless communication system are provided, thereby securing an efficient and optimal cell selection.

Effects obtainable from the present invention may be non-limited by the above mentioned effect. And, other unmentioned effects can be clearly understood from the following description by those having ordinary skill in the technical field to which the present invention pertains.

It is to be understood by those skilled in the art, to which the present invention pertains, that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a diagram for configuration of system information according to one embodiment of the present invention;

BEST MODE FOR CARRYING OUT THE INVENTION

Figure 1:
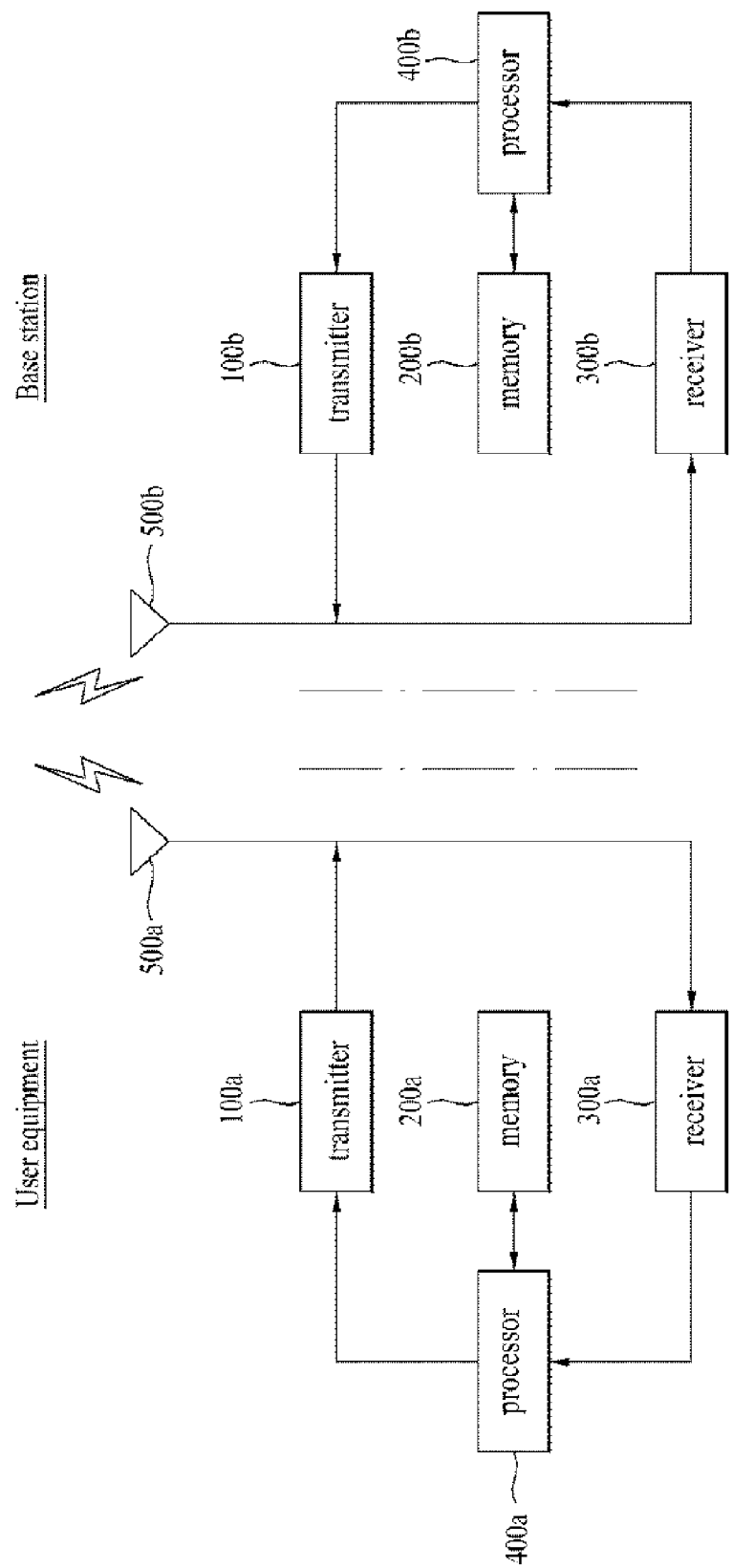
FIG. 1 is a block diagram for configuration of a user equipment and a base station, to which the present invention is applicable.

Reference will now be made in detail to the preferred embodiments of the present invention, examples of which are illustrated in the accompanying drawings. The detailed description of the present invention disclosed together with the accompanying drawings intends to describe exemplary embodiments of the present invention instead of a unique embodiment for the implementation of the present invention.

The detailed description of the invention in the following includes details to help the full understanding of the present invention. Yet, it is apparent to those skilled in the art that the present invention can be implemented without these details. Moreover, techniques, apparatuses (devices) and systems described in the following description may be applicable to various kinds of wireless multiple access systems. For example, the multiple access system may include one of CDMA (code division multiple access), FDMA (frequency division multiple access), TDMA (time division multiple access), OFDMA (orthogonal frequency division multiple access), SC-FDMA (single carrier frequency division multiple access), MC-FDMA (multi-carrier frequency division multiple access) system and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRAN is a part of UMTS (Universal Mobile Telecommunications System). 3GPP (3rd Generation Partnership Project) LTE (long term evolution) is a part of E-UMTS (Evolved UMTS) that uses E-UTRAN. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case that the present invention is applied to 3GPP LTE/LTE-A, by which the present invention is non-limited. For instance, although the detailed description of the invention may be based on a wireless communication system corresponding to 3GPP LTE/LTE-A system, it may be applicable to other random wireless communication systems except items unique to 3GPP LTE/LTE-A.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description of the present invention, a terminal may be stationary or may have mobility. And, the terminal may be a common name of a device for transceiving various kinds of data and control information by communicating with a base station. The terminal may be named one of a user equipment (UE), a mobile station (MS), a mobile terminal (MT), a user terminal (UT), a subscriber station (SS), a wireless device, a personal digital assistant (PDA), a wireless modem, a handheld device and the like.

A base station generally means a fixed station communicating with a terminal or other base stations and exchanges various kinds of data and control information by communicating with a terminal and other base stations. The base station may be named such a terminology as an evolved-NodeB (eNB), a base transceiver system (BTS), an advanced base station (ABS), a processing server (PS), a radio remote header (RRH), an access point (AP) and the like.

In the present invention, if a specific signal is assigned to one of frame, subframe, slot, carrier and subcarrier, it may mean that a specific signal is transmitted in an interval or timing of frame/subframe/slot via corresponding carrier/subcarrier.

FIG. 1 shows configuration of a user equipment and a base station, to which the present invention is applicable. In particular, a user equipment works as a transmitting device in UL or works as a receiving device in DL. On the contrary, a base station works as a receiving device in UL or works as a transmitting device in DL.

Referring to FIG. 1, a user equipment/base station (UE/BS) may include an antenna 500a/500b capable of transmitting and receiving information, data, signals and/or messages and the like, a transmitter 100a/100b transmitting information, data, signals and/or messages by controlling the antenna 500a/500b, a receiver 300a/300b receiving information, data, signals and/or messages by controlling the antenna 500a/500b and a memory 200a/200b storing various kinds of information within a wireless communication system temporarily or permanently. Moreover, the user equipment/base station may further include a processor 400a/400b configured to control various components by being operatively connected to the components including the transmitter, the receiver, the memory and the like.

The transmitter 100a, the receiver 300a, the memory 200a and the processor 400a in the user equipment may be implemented with separate chips as independent components, respectively. Alternatively, at least two of the transmitter 100a, the receiver 300a, the memory 200a and the processor 400a in the user equipment may be implemented with a single chip. On the other hand, the transmitter 100b, the receiver 300b, the memory 200b and the processor 400b in the base station may be implemented with separate chips as independent components, respectively. Alternatively, at least two of the transmitter 100b, the receiver 300b, the memory 200b and the processor 400b in the base station may be implemented with a single chip. Alternatively, the transmitter and the receiver may be integrated into a single transceiver in the user equipment or the base station.

The antenna 500a/500b may play a role in externally transmitting a signal generated from the transmitter 100a/100b. And, the antenna 500a/500b may play a role in receiving a signal from outside and then delivering the received signal to the receiver 300a/300b. Moreover, the antenna 500a/500b may be called an antenna port. In this case, the antenna port may correspond to a single physical antenna or may be configured by a combination of a plurality of physical antennas. In case that MIMO (multi-input multi-output) function of transceiving data and the like using a plurality of antennas is supported by a transceiver, at least two antennas may be connected to the transceiver.

The processor 400a/400b may generally control overall operations of various components or modules in the mobile/base station. In particular, the processor 400a/400b may be able to perform various control functions to implement the above-described embodiments of the present invention, a MAC (medium access control) frame variable control function according to service characteristics and propagation environment, a power saving mode function of controlling an idle mode operation, a handover function, an authentication and encryption function and the like. And, the processor 400a/400b may be named one of a controller, a microcontroller, a microprocessor, a microcomputer and the like. Moreover, the processor 400a/400b may be implemented by hardware, firmware, software or a combination thereof.

In case of implementing the present invention using hardware, the processor 400a/400b may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing the present invention using firmware or software, the firmware or software may be configured to include modules, procedures, and/or functions for performing the functions or operations of the present invention. And, the firmware or software configured to perform the present invention may be driven by the processor 400a/400b in a manner of being loaded in the processor 400a/400b or being saved in the memory 200a/200b.

The transmitter 100a/100b may perform prescribed coding and modulation on a signal and/or data, which is scheduled by the processor 400a/400b or a scheduler connected to the processor 400a/400b and will be then transmitted externally, and may be then able to deliver the coded and modulated signal and/or data to the antenna 500a/500b. The transmitter 100a/100b and the receiver 300a/300b of the user equipment/base station may be configured different in accordance with a method of processing a transmitted signal and a received signal.

The memory 200a/200b may store programs for processing and control of the processor 400a/400b and may be able to temporarily store input/output information. And, the memory 200a/200b may be utilized as a buffer. Moreover, the memory 200a/200b may include at least one of storage media including a flash type memory, a hard disk type memory, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

With the above-described structures, the user equipment and the base station may perform methods according to various embodiments described in the following description.

For example of a mobile communication system according to the present invention, 3GPP LTE system is described as follows.

Figure 2:
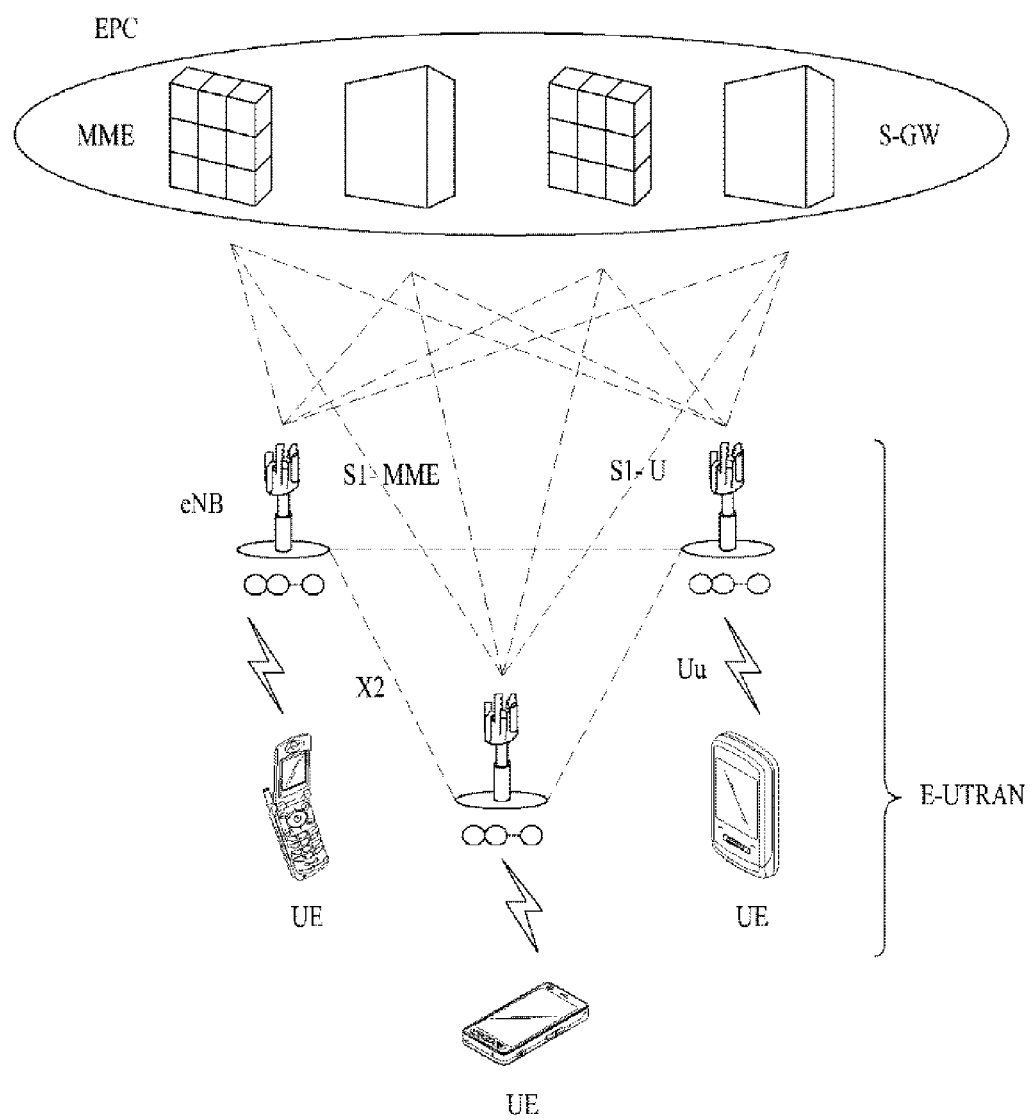
FIG. 2 is a diagram of a structure of E-UMTS (evolved universal mobile telecommunication system)

FIG. 2 is a diagram of a structure of E-UMTS (evolved universal mobile telecommunication system).

Referring to FIG. 2, E-UMTS is the system evolved from the conventional UMTS (universal mobile telecommunications system) and is currently standardized by 3GPP. Generally, E-UMTS may be called LTE (long term evolution) system. The E-UMTS may be divided into E-UTRAN (evolved terrestrial radio access network) and EPC (evolved packet core).

The E-UTRAN includes a base station or an evolved NodeB (hereinafter abbreviated eNB) and a user equipment (hereinafter abbreviated UE). The base stations (eNBs) are connected to each other by wire via X2 interface. And, the base station (eNB) and the UE are connected to each other by wireless via Uu interface.

The EPC may include a mobility management entity (hereinafter abbreviated MME) responsible for a function of a control plane, a serving gateway (hereinafter abbreviated S-GW) responsible for a function of a user plane, and a packet data network gateway (hereinafter abbreviated PDN-GW) responsible for a function of a user plane. An interface between the base station and the MME is named S1-MME interface and an interface between the base station and the S-GW is named S1-U interface. Moreover, both of the S1-MME interface and the S1-U interface may be generally named S1 interface.

The MME has access information of the UE or information on capability of the UE. Such information is mainly used for the mobility management of the UE. The S-GW is a gateway having the E-UTRAN as a terminal end point. And, the PDN-GW is a gateway having the PDN as a terminal end point.

A control message exchanged between the eNBs via the X2 interface uses X2AP (X2 application part) protocol and is called X2AP message. Another control message exchanged between the MME and the eNB via the S1 interface uses S1AP (S1 application part) protocol and is called S1AP message.

The Uu interface, which is a radio section, uses a radio interface protocol. In this case, the radio interface protocol can be divided into a first layer L1 including physical layers, a second layer L2 including MAC layer, RLC layer and PDCP layer, and a third layer L3 including RRC layers based on three lower layers of OSI (open system interconnection) reference model widely known in communication systems.

Figure 3:
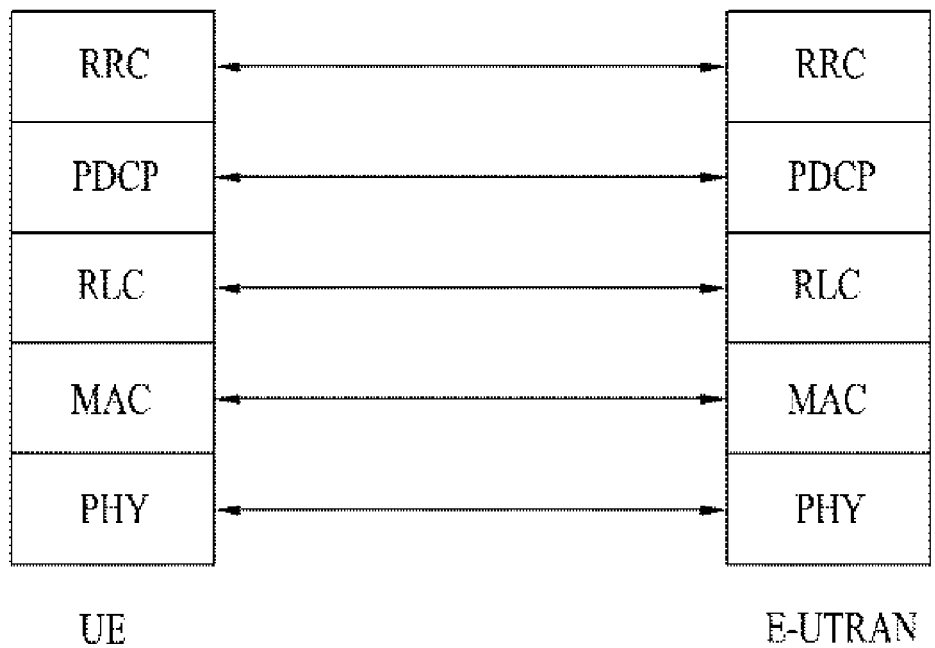
FIG. 3 and FIG. 4 are diagrams of structures of a radio interface protocol between UE and E-UTRAN by 3GPP radio access network specifications, to which the present invention is applicable.
Figure 4:
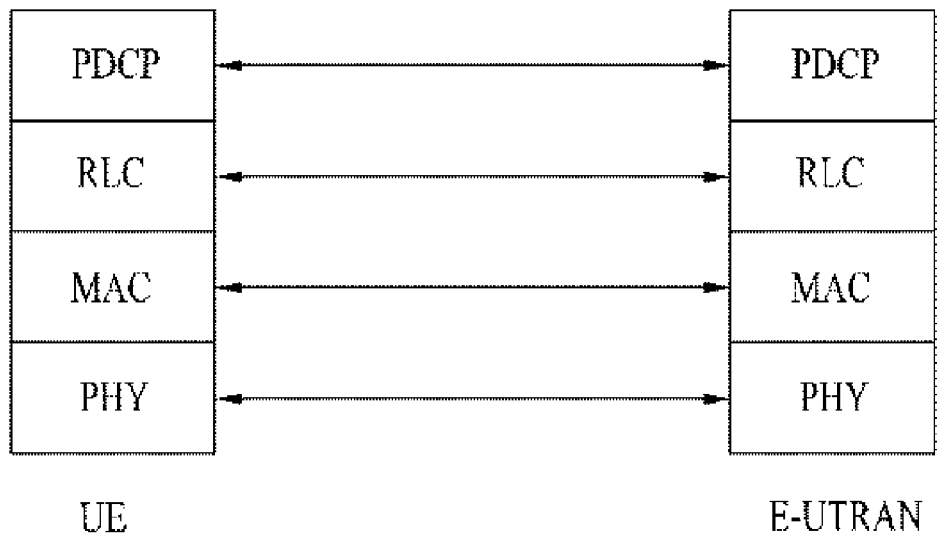

FIG. 3 and FIG. 4 are diagrams of structures of radio interface protocols between UE and E-UTRAN by 3GPP radio access network specifications according to the present invention.

Referring to FIG. 3 and FIG. 4, a radio interface protocol is horizontally constructed with a physical layer, a data link layer and a network layer. And, the radio interface protocol can be vertically divided into a user plane (hereinafter abbreviated U-plane) for a data information transfer and a control plane (hereinafter abbreviated C-plane) for a delivery of a control signal (i.e., signaling).

The protocol layers shown in FIG. 3 or FIG. 4 may be divided into a first layer L1, a second layer L2 and a third layer L3 based on three lower layers of OSI (open system interconnection) reference model widely known in communication systems. The radio protocol layers exist as pairs in UE and E-UTRAN and are responsible for the data transfer in a radio section. In the following description, the layers of the radio protocol control plane shown in FIG. 3 and the layers of the radio protocol user plane shown in FIG. 4 are explained in detail.

First of all, a physical layer of the first layer provides an information transfer service to an upper layer using a physical channel. The physical layer is connected to a medium access control (MAC) layer above the physical layer via a transport channel. And, data is transferred between the medium access control layer and the physical layer through the transport channel. In doing so, the transport channels may be mainly classified into a dedicated transport channel and a common transport channel in accordance with whether a channel is shared or not. Data is transferred between different physical layers, and more particularly, between a physical layer of a transmitting side and a physical layer of a receiving side. The physical layer is modulated by OFDM (orthogonal frequency division multiplexing) scheme and utilizes time and frequency as radio resources.

In the second layer, various kinds of layers exist. First of all, a medium access control (hereinafter abbreviated MAC) layer plays a role in mapping various logical channels to various transport channels, respectively. And, the MAC layer plays a role as logical channel multiplexing in mapping several logical channels to a single transport channel. The MAC layer is connected to an upper layer (e.g., RLC layer) via a logical channel. And, the logical channel may be mainly classified into a control channel of transporting information of a control plane and a traffic channel of transporting information of a user plane in accordance with a type of the transported information.

A radio link control (hereinafter abbreviated RLC) layer of the second layer plays a role in adjusting a data size to be suitable for a lower layer to transmit data in a radio section by segmentation and concatenation of data received from an upper layer. In order to secure various QoS requested by each radio bearer (hereinafter abbreviated RB), three kinds of operating modes, i.e., TM (transparent mode), UM (un-acknowledged mode) and AM (acknowledged mode) are provided. In particular, the RLC layer performs a retransmission function through ARQ (automatic repeat and request) function for the reliable data transmission.

A PDCP (packet data convergence protocol) layer of the second layer performs a header compression function for reducing an IP packet header size, which is relatively big and carries unnecessary control information, to efficiently transmit such an IP packet as IPv4, IPv6 and the like in a radio section having a narrow bandwidth. This plays a role in increasing transmission efficiency of a radio section by transmitting information mandatory for a header part of data only. Moreover, in LTE system, the PDCP layer also performs a security function that includes ciphering for preventing a data wiretap conducted by a stranger and integrity protection for preventing data manipulation conducted by a stranger.

A radio resource control (hereinafter abbreviated RRC) layer situated at the top of the third layer is defined in a control plane only. The RRC layer is responsible for controlling logical channels, transport channels and physical channels in association with configuration, reconfiguration and release of radio bearers (hereinafter abbreviated RBs). In this case, the RB means a service provided by the second layer for the data delivery between the UE and the E-UTRAN. In case that an RRC connection is established between the RRC layer of the UE and the RRC layer of the E-UTRAN, the UE is in RRC_CONNECTED state. Otherwise, the UE is in RRC IDLE state.

The RRC state of the UE and the RRC connecting method are further described as follows. First of all, the RRC state means whether the RRC of the UE is logically connected to the RRC of the E-UTRAN. If the RRCs are logically connected together, such a state can be named 'RRC_CONNECTED state'. Otherwise, such a state can be named 'RRC_IDLE state'. Since the UE in the RRC_CONNECTED state has the RRC connection, the E-UTRAN is able to recognize an existence of the corresponding UE by cell unit and is able to effectively control the corresponding UE. On the other hand, the E-UTRAN is unable to recognize the UE in the RRC_IDLE state. And, a core network (EPC) manages the UE in the RRC_IDLE state by tracking area (TA) unit that is a unit of area larger than a cell. In particular, a presence or non-presence of the UE in the RRC_IDLE state can be recognized by a larger area unit only. Therefore, in order to receive such a general mobile communication service as a voice service, a data service and the like, the corresponding UE should enter the RRC_CONNECTED state.

When a user initially turns on a power of a UE, the UE searches for an appropriate cell and then stays in RRC_IDLE state in the found cell. If the UE staying in the RRC_IDLE state needs to establish an RRC connection, the UE establishes the RRC connection with an RRC of E-UTRAN and then make a transition to RRC_CONNECTED state. For instance, if the UE in the idle state needs to establish the RRC connection, for example, it may mean a case that an uplink (hereinafter abbreviated UL) data transmission is required due to such a reason as a user's call attempt and the like, a case that a message is sent in response to a reception of a paging message from the E-UTRAN, and the like.

Meanwhile, downlink (hereinafter abbreviated DL) channels for transmitting data from eNB to UE include a broadcast channel (hereinafter abbreviated BCH) for carrying system information, a DL shared channel (DL SCH) for carrying a user traffic or a control message, and the like. A traffic or control message of a DL multicast or a broadcast service can be carried on the DL SCH or a separate DL MCH (multicast channel).

Meanwhile, UL channels for transmitting data from UE to eNB include a random access channel (hereinafter abbreviated RACH) for carrying an initial control message, a UL SCH (UL shared channel) for transmitting a user traffic or a control message.

Logical channels, which are situated above transport channels and mapped to the transport channels, include BCCH (Broadcast Channel), PCCH (Paging Control Channel), CCCH (Common Control Channel), MCCH (Multicast Control Channel), MTCH (Multicast Traffic Channel) and the like.

A physical channel may include several subframes on a time axis and several subcarriers on a frequency axis. In this case, one subframe may include a plurality of symbols on the time axis. One subframe may include a plurality of resource blocks. And, one resource block may include a plurality of symbols and a plurality of subcarriers. Each subframe may be able to use specific subcarriers of specific symbols (e.g., 1st symbol) of a corresponding subframe for PDCCH (physical downlink control channel), i.e., L1/L2 control channel. One subframe amounts to 0.5 ms and a unit time 'TTI (transmission time interval)' for transmitting data amounts to 1 ms corresponding to 2 subframes.

In the following description, system information is schematically explained. First of all, system information may include mandatory information for a user equipment to access a network. Therefore, a user equipment should receive all system information before accessing a network and have latest system information all the time. Since system information is the information all user equipments in a cell should be aware of, a network needs to broadcast system information periodically. System information may be divided into a master information block (MIB), a scheduling block (SB) and a system information block (SIB). The MIB provides information on a physical configuration (e.g., bandwidth) of a corresponding cell. The SB provides transmission information (e.g., transmission period) of SIBs. The SIB is a set of system information related to each other. For instance, a specific SIB contains information of a neighbor cell only. And, a specific SIB contains information on an uplink radio channel for a user equipment only.

In the following description, a method and procedure for a UE to select a cell are explained.

First of all, if a power is turned on in an early stage, a UE searches available networks (e.g., public land mobile network (PLMN)) and then selects an appropriate network to receive a service. Subsequently, a cell having a signal quality and property enough to provide an appropriate service to the user equipment is then selected from cells provided by the selected network. In particular, the cell selecting process can mainly divided into two kinds.

First of all, one of the two kinds is an initial cell selecting process. In this process, a UE is not provided with previous information on a radio channel. Hence, the UE searches all radio channels to find an appropriate cell. The UE searches each radio channel for a strongest cell. And, the UE searches for an appropriate cell that meets a cell selection reference and then selects the corresponding cell.

Secondly, the other is a cell selecting process by utilizing saved information. In this process, by utilizing information saved for a radio channel in a UE or information currently broadcasted in each cell, a cell is selected. Hence, compared to the initial cell selecting process, this process enables a quick cell selection. A UE searches for a cell that meets a cell selection reference and then selects the corresponding cell. If the UE is unable to find an appropriate cell, which meets the cell selection reference, through this process, the UE performs the initial cell selecting process.

A cell selection reference used by a UE in a cell selecting process may be represented as Math FIG. 1.

MathFigure 1

$$S_{rxlev} = Q_{rxlevmeas} - (Q_{rxlevmin} + Q_{rxlevminoffset}) - P_{compensation} > 0 \quad [\text{Math.1}]$$

In Math FIG. 1, $Q_{rxlevmeas}$ indicates a reception level of a measured cell (i.e., Reference Signal Received Power; RSRP), $Q_{rxlevmin}$ indicates a minimum necessary reception level in a cell, $Q_{rxlevminoffset}$ indicates an offset for $Q_{rxlevmin}$, $P_{compensation}$ indicates $\max(P_{EMAX} - P_{UMAX}, 0)$, $P_{EMAX}$ indicates a maximum transmission power transmittable by a UE in a corresponding cell, and $P_{UMAX}$ indicates a maximum transmission power of a UE radio transmitting unit in accordance with performance of a UE.

In Math FIG. 1, it may be observed that a UE selects a cell having measured signal strength and quality greater than specific values determined by a service providing cell. Parameters used by Formula 1 are broadcasted through system information. A UE receives the broadcasted parameter values and then uses for the cell selection reference.

If a UE selects a cell that meets a cell selection reference, the UE receives information required for RRC_IDLE state operation in the corresponding cell from system information of the corresponding cell. Having received all information required for the RRC_IDLE state operation, the UE makes a request for a service to a network or stands by in the RRC_IDLE state to receive the service from the network.

After a UE has selected a specific cell through a cell selecting process, a strength or quality of a signal between the UE and a base station may change due to mobility of the UE, a change of radio environment or the like. In case that a quality of a selected cell is degraded, a UE may be able to select another cell that provides a better quality. Thus, in case that a cell is re-selected, a cell providing a signal quality better than that of a currently selected cell is selected. This process is called a cell reselection. In aspect of a quality of a radio signal, the basic object of this cell reselecting process is to select a cell that provides a best quality to a UE in general.

Meanwhile, since the cell reselecting process substantially corresponds to a sort of a process for selecting a cell, it is apparent that a terminology 'cell reselection' and a terminology 'cell selection' may be interchangeably usable.

Aside from the aspect of the quality of the radio signal, a network determines a priority per frequency and may inform a UE of the determined priority. Having received this priority, the UE may preferentially consider the received priority in a cell reselecting process other than a radio signal quality reference.

As mentioned in the above description, there are a cell selecting method and a cell reselecting method in accordance with a signal property of a radio environment. When a cell is selected in the cell reselection, the following cell reselecting methods may be taken into consideration in accordance with a radio access technology (RAT) and frequency property of a cell.

First of all, one of the cell reselecting methods is intra-frequency cell reselection. According to the intra-frequency cell reselection, it may be able to reselect a cell having the same radio access technology (RAT) and center frequency of a cell currently used by a UE.

Secondly, one of the cell reselecting methods is inter-frequency cell reselection. According to the inter-frequency cell reselection, it may be able to reselect a cell having the same radio access technology (RAT) of a cell currently used by a UE and a center frequency different from that of the cell currently used by the UE.

Finally, one of the cell reselecting methods is inter-RAT cell reselection. According to the inter-RAT cell reselection, it may be able to reselect a cell having a radio access technology (RAT) different from that of a cell currently used by a UE. The principles of the cell reselecting process are described as follows.

First of all, for cell reselection, a UE measures qualities and other attributes (e.g., information contained in broadcast information) of serving and neighbor cells.

Secondly, the cell reselection is performed based on a cell reselection reference. In particular, the cell reselection reference has the following properties in association with a serving cell measurement and a neighbor cell measurement.

Intra-frequency cell reselection is basically based on a ranking. In particular, the ranking is a job of defining an index value for cell reselection evaluation and numbering cells in order of a size of the index value. In this case, a cell having a best index is normally called a best ranked cell. The cell index value results from applying a frequency offset or a cell offset on the basis of a value measured for a corresponding cell by a UE if necessary.

Inter-frequency cell reselection is based on frequency priority provided by a network. A UE attempts an access (i.e., camp-on) to a frequency having a top frequency priority. A network provides a frequency priority, which will be applied in common by UEs within a cell, through broadcast signaling or may provide a priority per frequency to each UE through UE-specific signaling (i.e., UE designated signaling). For the inter-frequency cell reselection, a network may be able to provide a UE with a parameter (e.g., frequency-specific offset) per frequency, which will be used for a cell reselection.

For the intra-frequency or inter-frequency cell reselection, a network may be able to provide a UE with a neighbor cell list (NCL) used for a cell reselection. In this case, the NCL contains a per-cell parameter (e.g., cell-specific offset) used for a cell reselection.

For the intra-frequency or inter-frequency cell reselection, a network may be able to provide a UE with a cell reselection black list used for a cell reselection. And, the UE does not perform a cell reselection on a cell contained in the black list.

In the following description, 'ranking' performed in the cell selecting process is explained in detail. An index value of a cell used in ranking a cell may be defined as Math FIG. 2. In Math FIG. 2, a subscript 's' means a serving cell and a subscript 'n' indicates a neighbor cell.

MathFigure 2

$$R_s = Q_{meas,s} + Q_{Hyst}$$ [Math.2]

$$R_n = Q_{meas,n} - Q_{offset}$$

In Math FIG. 2, $Q_{meas}$ indicates a quality value measured for a corresponding cell by a UE.

In case of the intra-frequency cell reselection, when a UE receives an offset $Q_{offset\ s,n}$ for a specific neighbor cell between a serving cell and a neighbor cell, $Q_{offset}$ corresponds to $Q_{offset\ s,n}$. If a Ue does not receive an offset $Q_{offset\ s,n}$ for a corresponding cell, $Q_{offset}$ corresponds to 0. In case of the inter-frequency cell reselection, when a UE receives an offset $Q_{offset\ s,n}$ for a corresponding cell, it corresponds to $Q_{offset} = Q_{offset\ s,n} + Q_{frequency}$. If a UE does not receive an offset value $Q_{offset\ s,n}$ for a corresponding cell, it corresponds to $Q_{offset} = Q_{frequency}$.

$Q_{hyst}$ is a parameter as follows. First of all, if a cell reselection index value $R_s$ of a serving cell and a cell reselection index value $R_n$ of a neighbor cell vary while similar to each other, variation result rankings are frequently changed. Hence, a UE may perform cell reselection by alternating two cells. Thus, $Q_{hyst}$ corresponds to a parameter to prevent a UE from reselecting two cells alternately in a manner of generating a sort of hysteresis in a cell reselection.

By Math FIG. 2, a UE measures $R_s$ of a serving cell and $R_n$ of neighbor cells, regards a greatest R value as a best ranked cell, and then selects this cell. This may be named R-criterion. According to the definition of R, it may be able to confirm that a cell quality plays a most important criterion in the cell reselection by the R criterion. If the reselected cell is not an appropriate cell, the UE excludes the corresponding frequency or cell from cell reselection targets.

Meanwhile, in case that a network provides such a specific service as MBMS (multimedia broadcast and multicast service) to cells on a specific frequency only, a UE attempting a reception of MBMS may want the network to put a top priority on a frequency of a corresponding cell.

In doing so, the network may be able to provide priority information on the frequency of the corresponding cell with a direct and dedicated signal (e.g., RRC signal) to a UE entering RRC_IDLE state from RRC_CONNECTED state. Yet, it is unable to provide a UE in RRC_IDLE state with the corresponding priority information via a direct and dedicated signal using RRC signal or the like. Hence, in this case, the network should change a priority of a frequency though a broadcast of system information only.

Yet, it may be unable to change a priority of a frequency for a specific UE (e.g., UEs desiring to receive MBMS) due to property of system information. In particular, even if some UEs in RRC_IDLE state desire the reception of MBMS, there has been no method of changing priority of frequency for the corresponding UEs only.

In the following description of embodiment, a method of changing a setting of a specific priority for UEs desiring a reception of a specific service only and a corresponding cell selecting method are explained. A setting change of a specific priority is described by taking one example of a setting change of priority for frequency. And, it is apparent that the priority setting change may apply to various kinds of priority setting changes in the same manner.

FIG. 5 is a diagram for configuration of system information according to one embodiment of the present invention. In particular, FIG. 5 shows a configuration of system information containing priority information. In this case, the priority information may correspond to priority information on a frequency.

Referring to FIG. 5, priority information may include ID or group ID for identifying the corresponding priority information, priority information on a frequency, area information and a probability factor.

The ID or group ID corresponds to ID or group ID owned by UEs to use the corresponding priority information. The area information may be configured with a cell list or TA/LA/RA (tracking area/location area/routing area) list. Using the area information, a network may be able to set a cell or area for which priority information on a frequency is valid. For instance, a UE may be able to recognize that the corresponding priority information is valid for a cell indicated by the area information only.

The probability factor is usable when a UE saves priority information. If the probability factor is included in the priority information, a UE creates a random number. If the created random number is equal to or greater than the probability factor by comparison, the UE saves and uses the corresponding priority information. On the contrary, if the created random number is smaller than the probability factor by comparison, the UE ignores the corresponding priority information but saves and uses common priority information contained in the system information.

This system information may apply to system information block type 5 (SIB5) providing inter-frequency cell reselection information, system information block type 6 (SIB 6) providing UTRA cell reselection information and the like in LTE for example of a wireless communication system. This is just exemplary. And, the present invention may be non-limited by this example.

Figure 6:
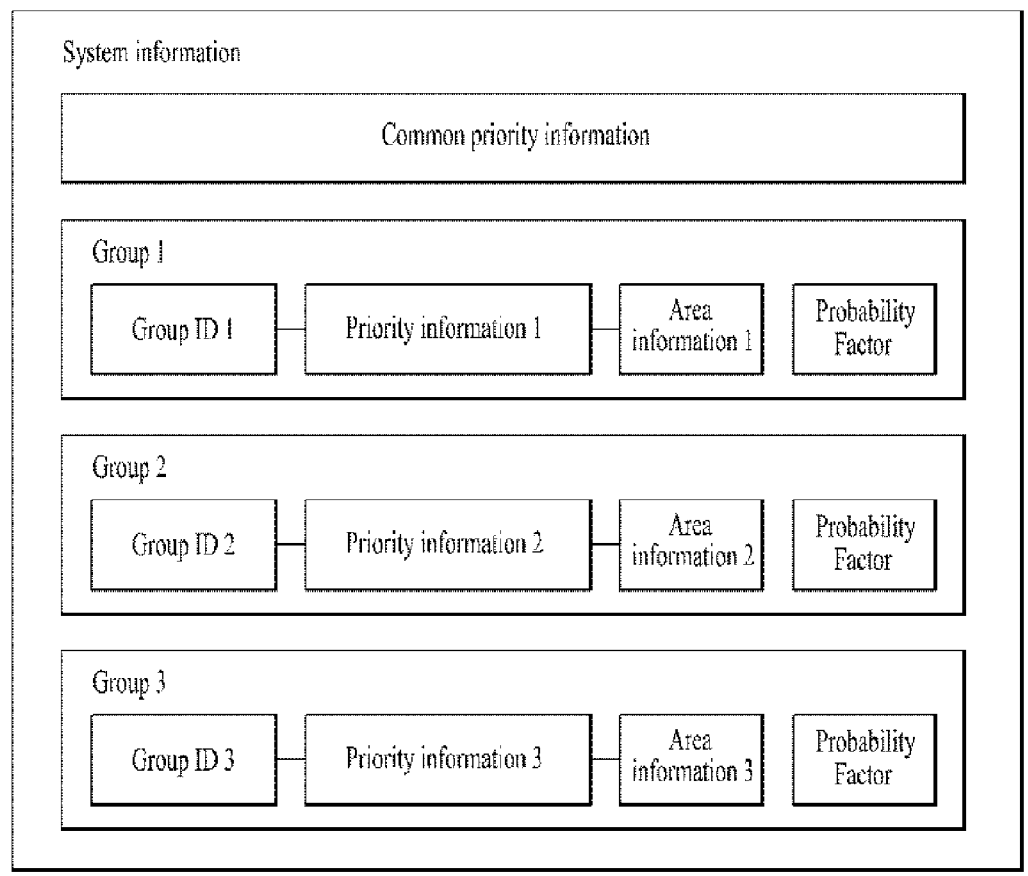
FIG. 6 is a schematic diagram for configuration of system information according to one embodiment of the present invention.

FIG. 6 is a schematic diagram for configuration of system information according to one embodiment of the present invention.

Referring to FIG. 6, system information may include common priority information and at least one priority information. The common priority information is the priority information for all UEs within a cell and may correspond to common frequency priority information. As mentioned in the foregoing description, each priority information may include ID or group ID, priority information, area information and a probability factor. The number and types of the priority information may be variously defined in accordance with the number and types of the provided specific services.

In the following description, a method of performing a cell selection using system information containing at least one priority information is explained with reference to FIG. 7.

Figure 7:
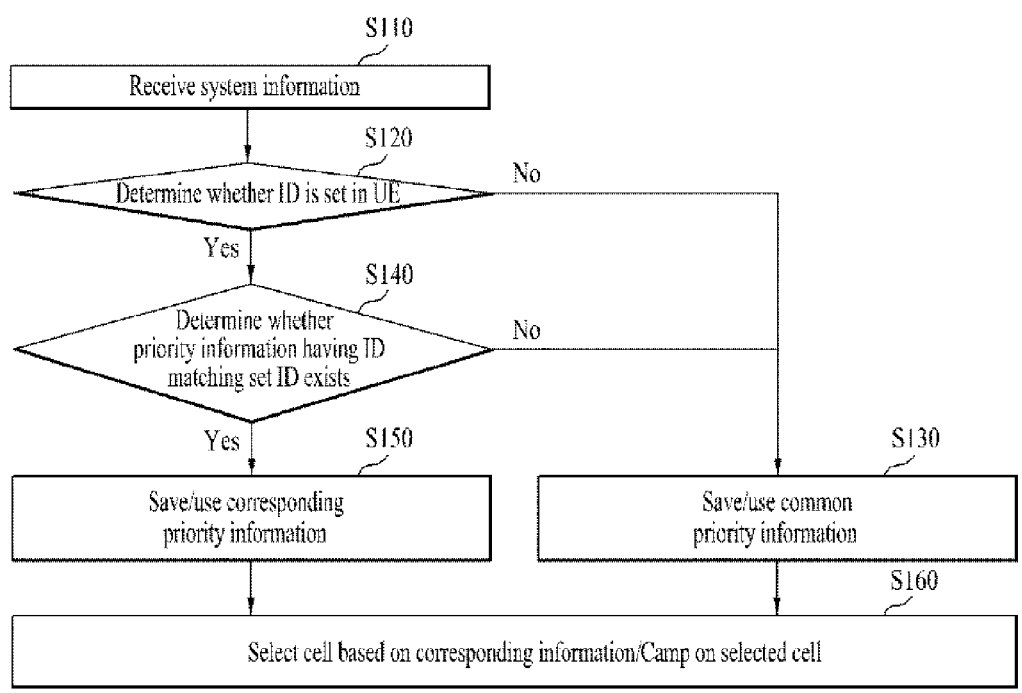
FIG. 7 is a flowchart for a cell selecting procedure according to a 1st embodiment of the present invention.

FIG. 7 is a flowchart for a cell selecting procedure according to a 1st embodiment of the present invention.

Referring to FIG. 7, a network may broadcast system information including common priority information and at least one priority information, In this case, the priority information includes ID or group ID.

The network may be able to assign or notify the ID or group ID for the priority information corresponding to a specific service to UEs in RRC_CONNECTED state in advance. For instance, the network transmits the ID or group ID in accordance with the priority information to the UEs in RRC_CONNECTED state via RRC signal directly or via dedicated signals.

If a UE desires a reception of a specific service, e.g., MBMS, it may set ID or group ID within itself to MBMS. In particular, if a UE desires a reception of a specific service, it may be able to set ID or group ID corresponding to the corresponding service by itself. And, the ID or group ID set by the UE may be set to indicate a specific broadcast.

Meanwhile, ID or group ID of priority information corresponding to a specific service may be set in a UE from the beginning. For instance, in order for MTC UE to receive priority information corresponding to MTC service in system information, a corresponding ID or group ID (e.g., MTC ID) may be set from the beginning.

Referring now to FIG. 7, a UE receives broadcasted system information [S110] and then determines whether ID or group ID is set in itself [S120]. If the ID or group ID is not set, the UE saves common priority information contained in the received system information and then uses the saved common priority information [S130]. If the ID or group ID is set, the UE compares the set ID or group ID with ID or group ID of at least one priority information contained in the received system information [S140]. In particular, the UE may determine the priority information having the ID or group ID that matches the set ID or group ID among a plurality of priority information. If the priority information including the ID or group ID matching the set ID or group ID exists in the received system information, the UE saves the corresponding priority information and then uses the saved priority information [S150]. In this case, the priority information may correspond to priority information on a frequency. On the contrary, if the priority information including the ID or group ID matching the set ID or group ID does not exist in the received system information, the UE saves common priority information and may then use the saved common priority information [S160]. The UE selects a cell having a best quality of a corresponding frequency using the saved priority information or the saved common priority information and then camps on the selected cell [S160].

In this case, 'camping on a cell' may mean that a UE is enabled to use a control channel by being tuned to a center frequency of the cell. Therefore, the UE may be able to receive such control information as a paging message, system information and the like from the camp-on cell. Moreover, the UE may perform a random access process or make a request for an RRC connection to the network.

Meanwhile, priority information for a specific service within system information received by a UE is preferred to common priority information previously saved in the UE. For instance, in case that MBMS is provided with a plurality of broadcast services, priority information may be configured in a manner that a 1st ID or a 1st group ID indicates MBMS or a 2nd ID or a 2nd group ID indicates each of a plurality of the broadcast services. Through this, by providing priority information per broadcast service within MBMS, each UE desiring to receive it may be able to camp on a cell on a frequency of providing the corresponding broadcast service.

Figure 8:
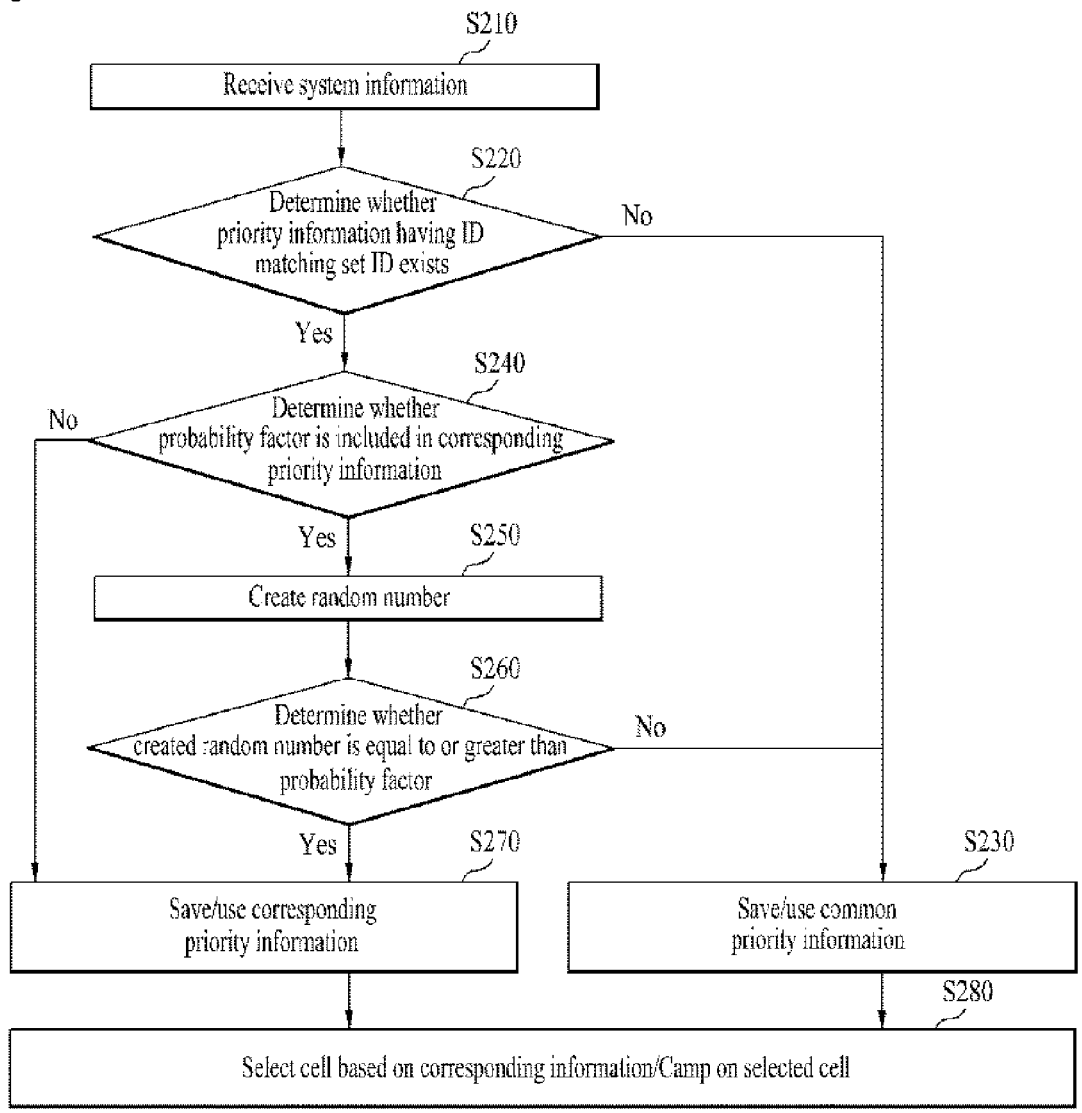
FIG. 8 is a flowchart for a cell selecting procedure according to a 2nd embodiment of the present invention.

FIG. 8 is a flowchart for a cell selecting procedure according to a 2nd embodiment of the present invention. Although the present embodiment is described by taking one example of a case that a UE desires a reception of MBMS, it is apparent that the present embodiment is extensibly applicable to a MTC (machine type communication) service and the like.

Referring to FIG. 8, if a UE in RRC_IDLE state desires a reception of MBMS, it may be able to set ID or group ID to MBMS. If the UE sets the ID or group ID, it may receive system information from a base station of a currently camping-on cell [S210]. The UE determines whether frequency priority information corresponding to its ID or group ID exists in the received system information [S220]. If the priority information having an ID matching the ID or group ID does not exist in the received system information, the UE saves and uses common priority information contained in the received system information [S230]. If the priority information having an ID matching the ID or group ID exists in the received system information, the UE determines whether a probability factor is contained in the priority information corresponding to the corresponding ID or group ID [S240]. If the probability factor is not contained in the corresponding priority information, the UE saves and uses the corresponding priority information [S270]. If the probability factor is contained in the corresponding priority information, the UE creates a random number [S250]. The UE then compares the created random number with the probability factor [S260]. If the created random number is equal to or greater than the probability factor, the UE saves and uses the priority information contained together with the probability factor [S270]. On the contrary, if the created random number is smaller than the probability factor, the UE ignores the corresponding priority information and saves and uses common priority information contained in the received system information [S230]. Using the saved priority information or the saved common priority information, the UE in RRC_IDLE state selects a cell having a best quality of a corresponding frequency and then camps on the selected cell [S280].

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of performing a cell reselection according to the present invention is available for various wireless communication systems including 3GPP LTE/LTE-A, IEEE 802 and the like.

The invention claimed is:

1. A method of performing a cell selection by a User Equipment (UE) in a wireless communication system, the method comprising:
  receiving a plurality of priority information, wherein each of the plurality of priority information includes an identifier;
  determining priority information having an identifier matched with an identifier stored in the UE;
  performing the cell selection based on the determined priority information; and
  performing the cell selection based on common priority information if there is no priority information having the identifier matched with the identifier stored in the UE,
  wherein the plurality of priority information is included in broadcasted system information, and
  wherein the broadcasted system information includes the common priority information.

2. The method of claim 1, further comprising:
  generating a random number if the determined priority information includes a probability factor; and
  determining whether the generated random number is larger than the probability factor.

3. The method of claim 2, further comprising:
  performing the cell selection based on the common priority information if the generated random number is smaller than the probability factor.

4. The method of claim 1, further comprising:
  performing the cell selection based on the common priority information, if there is no the identifier stored in the UE.

5. An apparatus for performing a cell selection in a wireless communication system, the apparatus comprising:
  a receiver configured to receive data or information; and
  a processor configured to control the receiver to receive a plurality of priority information, wherein each of the plurality of priority information includes an identifier, and wherein the processor is further configured to:
    determine priority information having an identifier matched with a stored identifier,
    perform the cell selection based on the determined priority information, and
    perform the cell selection based on common priority information if there is no priority information having the identifier matched with the identifier stored in the apparatus,
  wherein the plurality of priority information is included in broadcasted system information, and
  wherein the broadcasted system information includes the common priority information.

6. The apparatus of claim 5, wherein the processor is configured to generate a random number if the determined priority information includes a probability factor, and configured to determine whether the generated random number is larger than the probability factor.

7. The apparatus of claim 6, wherein the processor is configured to perform the cell selection based on the common priority information if the generated random number is smaller than the probability factor.

8. The apparatus of claim 5, wherein the processor is configured to perform the cell selection based on the common priority information, if there is no the stored identifier.

* * * * *